(No Model.)
J. McKECHNIE & E. W. SMITH.
STREET SWEEPER.
No. 592,816. Patented Nov. 2, 1897.
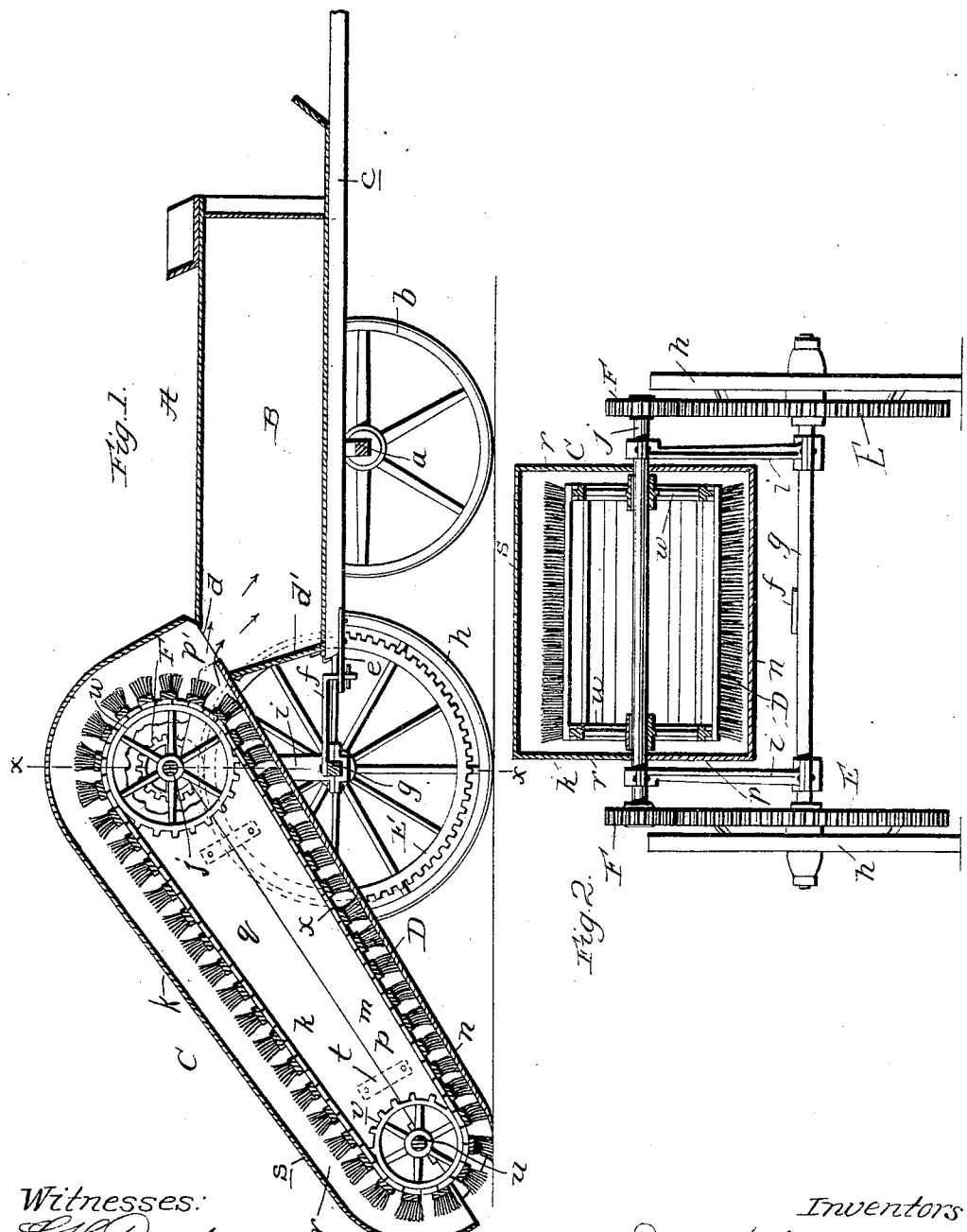
Witnesses:
Inventors
J. McKechnie &
E. W. Smith
By James J Shelby
Attorney

UNITED STATES PATENT OFFICE.

JOHN McKECHNIE AND EDWARD W. SMITH, OF WINNIPEG, CANADA.

STREET-SWEEPER.

SPECIFICATION forming part of Letters Patent No. 592,816, dated November 2, 1897.

Application filed December 4, 1896. Serial No. 614,454. (No model.)

*To all whom it may concern:*

Be it known that we, JOHN McKECHNIE and EDWARD W. SMITH, subjects of the Queen of Great Britain, residing at Winnipeg, in the Province of Manitoba, Dominion of Canada, have invented certain new and useful Improvements in Street-Sweepers; and we do declare the following to be a full, clear, and exact description of the invention, such as will enable others skilled in the art to which it appertains to make and use the same.

Our invention relates to improvements in that class of street-sweepers which are designed to be detachably connected to and raise dirt into a cart; and its novelty and advantages will be fully understood from the following description and claim, when taken in conjunction with the accompanying drawings, in which—

Figure 1 is a longitudinal central section of our improved sweeper, the same being shown as connected to a cart; and Fig. 2 is a vertical transverse section of the sweeper, taken in the plane indicated by the line $x$ $x$ of Fig. 1.

Referring by letter to the said drawings, A indicates a cart having the usual axle $a$, supporting-wheels $b$ thereon, and shafts or thills $c$, and B indicates the cart-body, which is mounted on the axle $a$ in the ordinary or any suitable manner. This body B is closed and provided in its top and rear end with the opening $d$ for the entry of dust, dirt, &c., and is provided with the hinged end wall $d$ to facilitate dumping the dust and dirt. We also provide the body B with a loop $e$ at its rear end designed to receive the hook $f$, connected to and extending forwardly from the axle $g$ of the sweeper C; but it is obvious that any other suitable means may be employed to detachably connect the cart and sweeper, so as to enable the draft animal or animals hitched to the cart to draw the sweeper, and so as to permit of the cart being disconnected from the sweeper when it has received a load of dust and dirt.

The axle $g$ of the sweeper C is provided at its ends with supporting and traveling wheels $h$, and it serves to support standards $i$, which are connected to and rise from it, as better illustrated in Fig. 2. In these standards $i$ is journaled a transverse shaft $j$, and on this shaft is supported the casing $k$, which incloses the sweeping mechanism and is designed and adapted to confine the dust raised by the same. This casing $k$ comprises the lower section $m$ and the upper section or hood $q$. The said lower section has the inclined bottom $n$ and the side walls $p$, while the upper section or hood has the side walls $r$, which are provided at their upper ends with the depending portions $p'$, bearing against the upper ends of side walls and the transverse top wall $s$. The side walls of the sections $m$ $q$ are connected by the straps $t$, and the bottom wall $n$ of section $m$ is designed to bear at its lower end upon the street and at its upper end upon the end-gate $d'$ of the cart A, as shown. In virtue of this and the provision of the depending portions $p'$ on the upper casing-section it will be seen that the lower casing-section $m$ is designed to support the upper casing-section $q$ and take all strain off the connecting-straps $t$, and it will also be seen that the straps $t$ permit of the upper casing-section $q$ being readily disconnected from the lower casing-section when it is necessary to clean or repair the brushes or gearing of the machine.

The inclined bottom wall $n$ of the lower casing-section is, as stated, designed to bear at its lower end upon the street and at its upper end upon the end-gate $d'$ of the cart A, as shown, and the transverse top wall $s$ of the upper casing section or hood is so shaped that its lower end rests adjacent to the street, while its upper end will rest adjacent to the top of the cart, so as to effectually prevent the escape of dust and thus permit of the sweeper being used in the daytime without annoyance to people on the street.

$u$ indicates a transverse shaft which is journaled in suitable bearings connected to the side walls of the casing C, adjacent to the lower end thereof. This shaft $u$ is provided adjacent to the side walls of the casing C with sprocket-wheels $v$ of about the proportional diameter illustrated, and the shaft $j$ is also provided with sprocket-wheels $w$, which are preferably of a slightly greater diameter than the wheels $v$ and are arranged in alinement with said wheels $v$, as shown. These sprocket-wheels $v$ $w$ are connected by the parallel sprocket-belts $x$, to which are connected at suitable intervals the heads of transverse brushes D, which extend almost the entire width of the casing. In virtue of this construction it will be seen that when the sweeper is drawn along and the belts $x$ are caused to move in the direction indicated by arrow in Fig. 1 the brushes D will sweep the dust and dirt from the street onto the inclined bottom $n$ of the casing C and will carry such dust and dirt before them on said inclined bottom until it reaches the upper end of the same, when it will fall into the cart.

In order to drive the brush-belts in the direction indicated by arrow when the sweeper is drawn forwardly, we provide the gear-wheels E, which are fixedly connected to the traveling wheels $h$, and the pinions F, which are fixed on the shaft $j$ and mesh with the gear-wheels E, as shown. The gear-wheels and pinions are of such a proportional size as to drive the brush-belts at the proper speed as the sweeper is drawn slowly forward.

In using our improved sweeper a cart such as shown and described is backed against the forward end of the sweeper and is connected thereto in the manner described. The cart, with the sweeper behind it, is drawn forwardly by the draft-animal of the cart until enough dirt is swept up and into the cart to load the same, when the cart is disconnected and hauled off to the dump.

We contemplate employing a number of the carts A in conjunction with our improved sweeper, and therefore it will be seen that when one cart is loaded its place may be taken by another cart and the sweeping proceeded with while the first cart is being hauled to and from the dump.

It will also be observed that the forward end of our improved sweeper is supported by the wheels $h$ and axle $g$ and that the rear end bears upon and is supported by the ground over which the sweeper is drawn. In virtue of this arrangement all the weight is taken off the cart, and it will also be seen that such arrangement permits of the casing entirely inclosing the endless belt of brushes except at the point where the brushes come into contact with the street and the opening which communicates with the interior of the cart-body, so as to effectually prevent the escape of the dust and dirt raised by the brushes.

We are well aware that a street-sweeper comprising a casing and an endless belt of brushes arranged in said casing and adapted to sweep the dirt from the street and raise the same into a cart is, broadly, old, and we make no claim to the same; but

What we claim, and desire to secure by Letters Patent, is—

The herein-described street-sweeping machine consisting essentially of the axle, traveling and supporting wheels mounted on said axle, a gear-wheel fixed with respect to one of said traveling and supporting wheels, the transverse shaft $j$, journaled in standards or supports rising from the axle, the lower casing-section $m$, having the inclined bottom or floor $n$, bearing at its rear end upon the ground and extending in advance of the axle, and the side walls $p$, extending from a point adjacent to the ground to a point in advance of the axle, the upper casing-section $q$, having the side walls extending to a point adjacent to the ground and provided at their upper ends with the depending portions $p'$, bearing against the upper ends of the side walls $p$, of section $m$, and the transverse top wall provided with the depending portion at its upper end serving in conjunction with the upper end of wall $n$, to form a downwardly-disposed opening and also having the depending portion at its lower end serving in conjunction with the lower end of wall $n$, to form an opening, the straps $t$, connecting the casing-sections $m$, and $q$, the shaft $u$, journaled in the side walls of the casing adjacent to the lower end thereof, sprocket-wheels mounted on the shafts $j$, and $u$, belts taking around said wheels, transverse brushes connected to said belts, and a pinion fixed on the shaft $j$, and meshing with the gear-wheel connected to one of the traveling or supporting wheels, all as and for the purpose set forth.

In testimony whereof we affix our signatures in presence of two witnesses.

JOHN McKECHNIE.
EDWARD W. SMITH.

Witnesses:
A. E. WILKES,
R. H. NUNN.